Patented Mar. 22, 1932

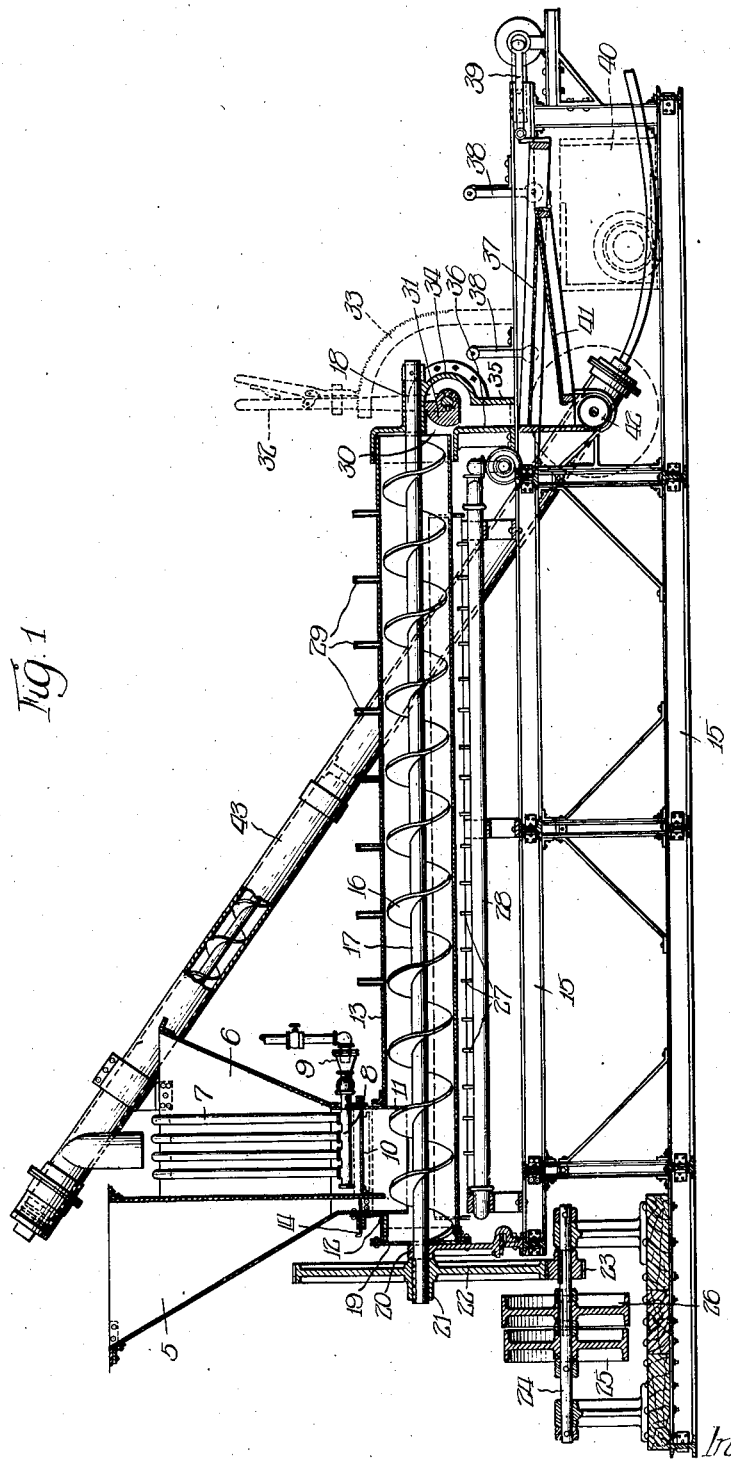

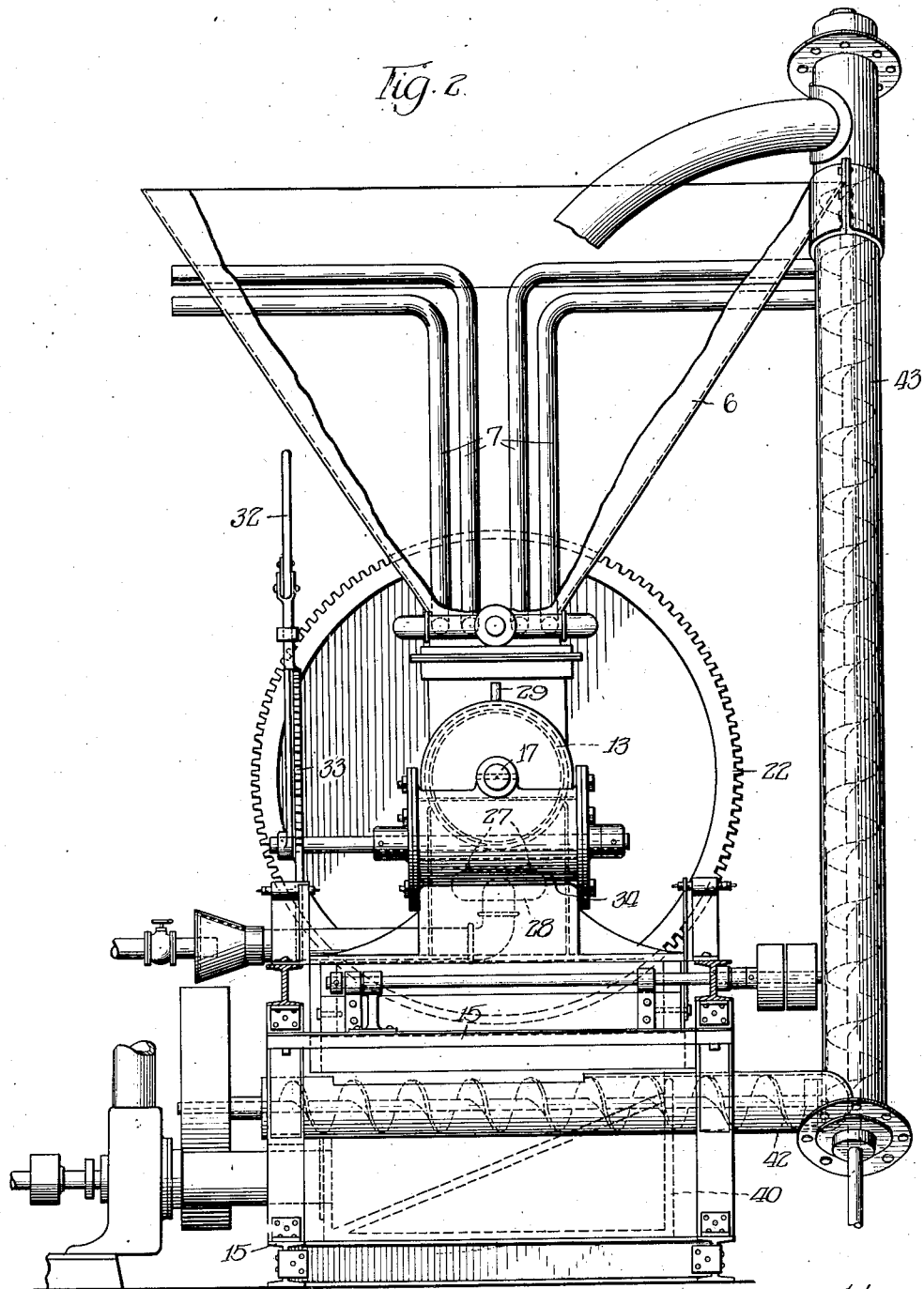

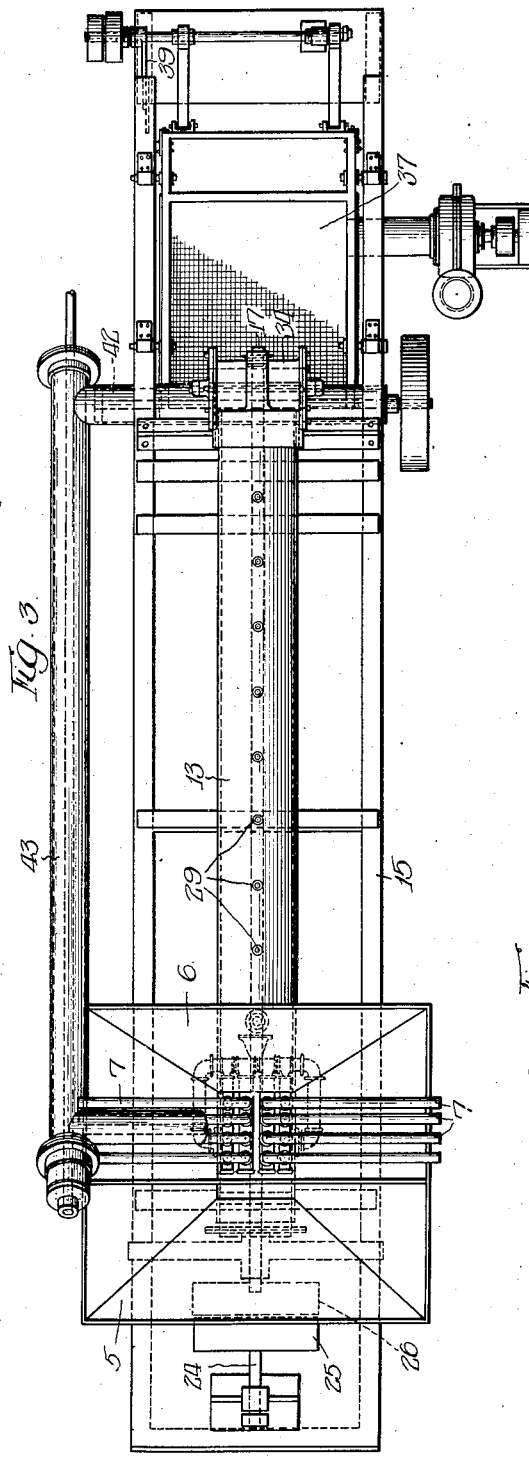
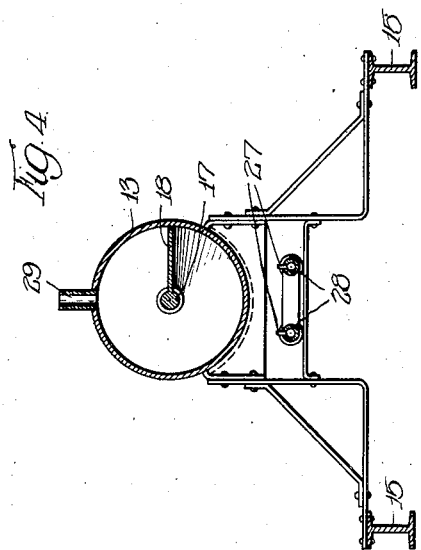

1,850,971

UNITED STATES PATENT OFFICE

JOSEPH L. ROSENFIELD, OF ALAMEDA, CALIFORNIA

HEAT SEALED COFFEE, PEANUTS, AND OTHER SUCH PRODUCTS, THAT ARE USUALLY ROASTED TO BRING OUT THEIR FLAVORS, AND PROCESS OF PRODUCING SAME

Application filed July 29, 1926. Serial No. 125,698.

My present invention, while generally relating to the prepartion of materials, has particular reference to the treatment, so to speak, of granular or the like raw commodities, such as coffee, cocoa beans, peanuts, and other such commodities, which are ordinarily roasted prior to their ultimate preparation for consumption. The field of operation embraced by the process, is in no way confined to the treatment of the specific granular commodities named, and in this connection, so far as concerns the possibilities of the invention, I do not make any distinction between peanuts, cocoa beans, coffee and such distinctively granular materials, and any other edible materials the nature of which, while not granular in the accepted meaning of the term, are at the same time in such form permitting the same to be accommodated by the apparatus, and in which the process will develop advantageous results.

As one outstanding example of this possibility I will mention the cooking of whole and unpeeled potatoes. There are, of course, other food products which may also be included but the examples given will suffice to explain the process and operation of the apparatus.

To begin with, I have discovered that certain edible products when treated in accordance with my process develop unusually pleasing flavors, aromas, and other desirable qualities heretofore unknown to exist. This applies for the most part to coffee, peanuts and other such products that are usually roasted to bring out their flavors. The same principle would likewise apply in other instances, as for example, in baking potatoes, but its most important use would apply in connection with those products which require a preliminary roasting treatment prior to final preparation for ultimate consumption, and without limiting the spirit of the invention to these particular products, I will use the same as a basis of illustration.

Briefly the invention has to do with commingling the granular material to be treated with a subdivided heat vehicle which imparts to the product the required heat to roast or cook the same to a predetermined extent, whereby the resultant product, while resembling nothing more than the same product roasted as heretofore practiced, will develop a decided improvement in flavor, aroma, and other desirable qualities when ultimately prepared for consumption.

I am not prepared at this time to advance any reliable theories as to the why and wherefore of this phenomenon, except to say that every indication points to what I believe to be a quick, if not an instantaneous skin sealing effect which develops a sealing film on the outside of the coffee bean, as an example, and completely sealing the bean so that the full flavor of the volatile constituents are positively retained within and carried intact until the product is finally prepared for consumption or consumed without other preparation, as in the case of ordinary roasted peanuts. This skin sealing is the result of a dry searing of the goods, and the sealing skin produced may be referred to as "dry seared" outer surface. It is not to be confused with effects produced by cooking the article in hot oil or grease.

As still another feature of the process, and of equal importance, with element of time required to treat the materials. For instance, as heretofore practiced, it usually requires about thirty or forty minutes to roast coffee. With my improved process, I can complete the roasting of the same quantity of coffee in about five or six minutes and with better results.

Furthermore, the simplicity of the process will enable me to practice the same at least on a small scale at times and in places where the old methods and apparatus would be totally impractical if not impossible.

Further features will follow with reference to the accompanying drawings which illustrate a suitable apparatus for reducing the process to practice.

In said drawings Fig. 1 is a view in side elevation and partly in section, of a complete apparatus;

Fig. 2 is a view in end elevation of the apparatus, with part of the hopper broken away;

Fig. 3 is a plan view of the apparatus; and

Fig. 4 is a cross section through the roasting cylinder and the gas heater, the plane of section including one of the vents of the cylinder and one of the burners of the heater.

As previously stated, the process contemplates the use of a sub-divided heat vehicle as a means of roasting or otherwise treating the materials to realize the results desired and for this reason I provide a divided hopper or else a pair of hoppers 5 and 6, one of which namely 5, accommodating the raw material, and the other accommodating the sub-divided heat vehicle which may be sand, salt, or any similar material suitable for the purpose. I prefer sand for the most part, or else a composition in which sand predominates. At any rate the nature of vehicle is more or less immaterial, so long as it performs satisfactorily.

Since I desire to pre-heat the vehicle before mingling the product therewith, the hopper 6 is equipped with heating means preferably a gas heater embodying in its construction a plurality of heating tubes 7, each tube being connected to a manifold base 8, which in turn is connected to the burner 9. The pipes are separated so as to offer sufficient heat radiating surfaces to properly heat the sand contained in the hopper without undue loss of time, reckoned from the time it is deposited therein in successive quantities.

The products of combustion from the burner circulating through the pipes may be carried off by extending the pipes to a convenient flue or else terminating the same at a desirable distance away from the apparatus.

Both of the hoppers 5 and 6 are provided with discharge gates or one gate common to both, so as to release measured quantities of the product and likewise the sand, and after the operation of the apparatus is timed and established, this gate or the gates, as the case may be, may be set so as to hold any predetermined adjustment effecting the discharge area of the hoppers. These gates are shown at 10 in the enclosure 11 which comprises a skirt connecting the hoppers with the cylindrical roaster 13, the skirt extending through an opening in the roaster as at 12 adjacent the receiving end thereof.

The manipulating means for the gates is shown at 14. The roaster may be made in the form of a relatively long horizontal and stationary cylinder mounted upon a supporting structure 15. Mounted with freedom of rotation within the cylinder 13 and coaxially therewith, is an Archimedes screw 16, the shaft 17 for which is confined in an exterior journal 18 at the discharge end of the cylinder. The opposite end of the shaft extends through the closure 19 at the receiving end of the cylinder and aside from being journaled in the bearing 20 is keyed to the hub 21 of the large driven gear wheel 22. The wheel 22 is driven by the pinion 23 mounted on the shaft 24 and the shaft is driven in turn by either of the two variable speed pulleys 25 and 26, one pulley being larger than the other so that a belt, not shown, may be transferred from one to the other for developing a change of speed for the screw 16.

Disposed beneath the cylinder 13 for substantially the length of the same are a series of gas burners 27, the same being arranged at spaced intervals along a manifold pipe 28 which is supplied with gas from a suitable source of supply. These burners are provided as a means of heating the cylinder which in turn will maintain the heated state of the sand passing through the cylinder. The control for the burners will enable the temperature control for the sand to be accurately and evenly adjusted.

With this much of the apparatus explained, it will be readily seen that when the gate or gates 10 are opened to release a predetermined quantity of heated sand and raw material, to be heat-treated thereby, the materials will be deposited in a more or less mixed or commingled state at least in immediate association with one another, and as the screw 16 is rotating at the time the mixed materials will be carried toward the opposite end of the cylinder and at the same time agitated and commingled one with the other. As a result the particles of raw-material, coffee beans, for instance, will be embedded in and by agitation commingled with hot sand and thoroughly roasted by the time they are discharged from the cylinder and separated from the sand.

The proportion of sand to raw material will vary according to requirements. Such adjustments likewise apply to the temperature of the sand and the speed of operation. In most instances I heat the sand to a temperature and use enough of it to assure a quick skin sealing as otherwise the best results may be sacrificed.

In treating most material little, if any, moisture will be accumulated in the cylinder 13. However, to avoid such a possibility the top of the cylinder may be equipped with a plurality of vents 29. When the commingled materials reach the discharge end of the cylinder, they are discharged through an opening 30, the port area of which is controlled by a cam valve 31 operated by a manually manipulated lever 32, the lever in this respect being operable in combination with a segment 33 so as to either hold the valve 30 closed, or else hold it open to any desired extent so as to control the amount of material released from the cylinder. The valve is mounted in a housing 34 having a downwardly depending apron 35 which is so disposed in relation to the wall 36 as to provide a chute for directing the mixed materials onto the inclined shaker screen 37. The screen is suspended from the pivoted hangers 38 and more or less violently reciprocated by a short stroke pitman 39. The inclined end of the screen is hung over a receptacle 40 which collects the treated product and from which it is conveyed away through a pipe or else otherwise emptied.

The separated sand falls on an inclined table 41 and then into the transverse sub-conveyor 42, from which it is collected by the screw conveyor 43 and returned into the hopper 6. The sand return provides a continuous process and the fact that the sand is practically unexposed to the air throughout, it loses little, if any, appreciable amount of heat. Any loss in this respect will be readily restored when the same is returned to the hopper.

I am fully aware that several attemps have been made in the past to use a subdivided heat vehicle such as sand for drying grain, but none of these methods have taught the use of my process for skin sealing the products so as to instantly seal the volatile constituents in the product and in this way improve the qualities of the product.

I make no claim to the process for any drying results, that may be accomplished with the apparatus, as in reality any such use would be of no value, considering the inherent qualities of the products that I have improved. Where the prior art has attempted to drive off the volatile content of the material, I to the contrary, make every effort to retain the volatiles by sealing the same in the product.

In the past, particularly in the case of coffee, it has often been difficult to get a "uniform roast". With my process this is assured, since each individual particle or bean is embedded in the sand so that all sides react to the heat which is likewise maintained at a uniform roasting temperature throughout the commingling stage of the process.

Ordinarily the ratio of sand to material roasted will be about 2 or 3 to one, that is to say about 2 or 3 parts sand to one part material. These proportions will naturally vary according to the accommodations afforded by the apparatus and the nature of the material prepared. I might also explain at this point that the quantity of mixed material and sand will just about keep the shaft of the screw buried. At least a sufficient amount of sand is maintained in the cylinder so as to avoid any possibility of the material floating, so to speak, on top of the sand. The screw, however, will keep the mix thoroughly agitated and will be continuously picking the sand up from the bottom and keeping it stirred up. This is important in order to keep the particles of material buried or embedded so that a uniform roast will result.

As previously stated, the timing of operations is important as by this means the roast may be prolonged or shortened, as occasion demands. The temperature control is likewise important to accommodate the process to different kinds of materials.

I claim:

1. The process of roasting coffee, peanuts, and other such products that are usually roasted to bring out their flavors, which consists in introducing the material while in a raw state into and submerging it in a solid subdivided heat vehicle that has been previously heated to roasting temperature, thereby quickly skin sealing the surface of material, and thereafter completing the roasting process by the continued submergence of the material in such a heat vehicle.

2. The process as described in claim 1, in which the material to be roasted and the subdivided solid heat vehicle are agitated together in the roasting receptacle.

3. The process of roasting coffee, which consists in introducing into an elongated roasting receptacle coffee to be roasted, together with a subdivided heat conveying solid material that has previously been brought to coffee-roasting temperature outside said roasting receptacle, the temperature of said material being sufficient to quickly skin-seal the surface of the coffee as the material and coffee meet, causing said material and coffee to simultaneously travel said roasting receptacle with the coffee submerged in the material, and regulating the time of passage of the coffee and material through the receptacle to correspond with the time required for completing the roasting operation.

4. As a new article of manufacture, coffee, peanuts, and other such products as are usually roasted to bring out their flavor, having impervious, dry seared, outer surfaces and having their contained volatile constituents sealed within them through means of said impervious surfaces.

5. As a new article of manufacture, peanuts and other such products that are usually roasted to bring out their flavor and which have kernel-enveloping skins, having the outer surfaces of their kernels beneath their skins dry seared and impervious, and with their volatile constituents preserved within them through means of their said surfaces.

6. As a new article of manufacture, peanuts and such products that are usually roasted to bring out their flavor, having impervious, dry seared outer surfaces; said products being free from added substances and having their contained volatiles sealed within them through means of said impervious surfaces.

JOSEPH L. ROSENFIELD.

CERTIFICATE OF CORRECTION.

Patent No. 1,850,971.  Granted March 22, 1932, to

JOSEPH L. ROSENFIELD.

It is hereby certified that error appears in the printed specification of the above numbered patent requiring correction as follows: Page 1, line 76, for the word "with" read is the; and that the said Letters Patent should be read with this correction therein that the same may conform to the record of the case in the Patent Office.

Signed and sealed this 31st day of May, A. D. 1932.

M. J. Moore,
Acting Commissioner of Patents.

(Seal)